(12) United States Patent
Chevalier et al.

(10) Patent No.: US 12,313,170 B2
(45) Date of Patent: May 27, 2025

(54) ASSEMBLY OF FLUID MODULES

(71) Applicant: SARTORIUS CHROMATOGRAPHY EQUIPMENT, Pompey (FR)

(72) Inventors: Jérôme Chevalier, Pournoy-la-Grasse (FR); Thierry Brocki, Malzeville (FR)

(73) Assignee: SARTORIUS CHROMATOGRAPHY EQUIPMENT, Pompey (FR)

( * ) Notice: Subject to any disclaimer, the term of this patent is extended or adjusted under 35 U.S.C. 154(b) by 0 days.

(21) Appl. No.: 18/036,143

(22) PCT Filed: Nov. 9, 2021

(86) PCT No.: PCT/FR2021/051980
§ 371 (c)(1),
(2) Date: May 9, 2023

(87) PCT Pub. No.: WO2022/101575
PCT Pub. Date: May 19, 2022

(65) Prior Publication Data
US 2023/0400110 A1    Dec. 14, 2023

(30) Foreign Application Priority Data

Nov. 10, 2020    (FR) ........................ 2011556

(51) Int. Cl.
*F16K 11/10*    (2006.01)
*F16K 27/00*    (2006.01)

(52) U.S. Cl.
CPC ............ *F16K 11/10* (2013.01); *F16K 27/003* (2013.01); *Y10T 137/87885* (2015.04)

(58) Field of Classification Search
CPC ........................................... Y10T 137/87885
See application file for complete search history.

(56) References Cited

U.S. PATENT DOCUMENTS

| 4,136,713 A | 1/1979 | Humphreys |
| 6,035,893 A * | 3/2000 | Ohmi ............... F16K 27/003 |
| | | 137/884 |

(Continued)

FOREIGN PATENT DOCUMENTS

| DE | 202006015673 U1 | 3/2007 |
| DE | 202012003844 U1 | 7/2012 |

(Continued)

OTHER PUBLICATIONS

Bükert, "Modular Water Valve System," Version A, Sep. 22, 2017, 8 pages.

(Continued)

*Primary Examiner* — Robert K Arundale
(74) *Attorney, Agent, or Firm* — Alleman Hall & Tuttle LLP

(57) ABSTRACT

An assembly includes:
a first fluidic module comprising a block comprising a first face, one or more central conduits, at least one lateral line connected to one of the central conduits, and a first closure member configured so as to close or open the at least one lateral line; and
a second fluidic module comprising a block comprising a first face, a first central conduit, a first lateral conduit connected to the first central conduit, a second central conduit and a second lateral conduit connected to the second central conduit, and a second closure member configured so as to close or open the opening of the first lateral conduit and/or of the second lateral conduit; wherein the first face of each of the first and second fluidic modules is assembled with the face of a block of another fluidic module by contact between the two faces.

17 Claims, 6 Drawing Sheets

(56) References Cited

U.S. PATENT DOCUMENTS

| | | | |
|---|---|---|---|
| 6,125,887 A * | 10/2000 | Pinto | F16K 27/003 |
| | | | 137/884 |
| 6,298,881 B1 * | 10/2001 | Curran | F16K 27/003 |
| | | | 137/884 |
| 6,892,763 B2 | 5/2005 | Burkhardt et al. | |
| 2002/0020445 A1 * | 2/2002 | Hettinger | F15B 13/0814 |
| | | | 137/270 |
| 2006/0027275 A1 | 2/2006 | Eriksson et al. | |
| 2006/0048830 A1 * | 3/2006 | Tokuda | F16K 27/003 |
| | | | 137/884 |
| 2006/0086398 A1 * | 4/2006 | Silva | F16K 27/029 |
| | | | 137/884 |
| 2010/0096031 A1 * | 4/2010 | Okase | F16K 27/003 |
| | | | 251/366 |
| 2011/0108485 A1 * | 5/2011 | Bisschops | G01N 30/466 |
| | | | 210/659 |
| 2013/0269791 A1 | 10/2013 | Hermann et al. | |
| 2015/0075660 A1 * | 3/2015 | Inada | F15B 13/0871 |
| | | | 137/884 |

FOREIGN PATENT DOCUMENTS

| | | |
|---|---|---|
| DE | 102013103545 B4 | 2/2019 |
| EP | 2102509 B1 | 9/2010 |
| EP | 1948339 B1 | 6/2011 |
| FR | 2896549 A3 | 7/2007 |

OTHER PUBLICATIONS

European Patent Office, International Search Report and Written Opinion Issued in Application No. PCT/FR2021/051980, Feb. 10, 2022, WIPO, 19 pages.

\* cited by examiner

ASSEMBLY OF FLUID MODULES

FIELD OF THE INVENTION

The present invention relates to a fluidic module that is capable of being assembled in a valve block type assembly that is usable in particular in a chromatography installation for the purification of biomolecules, as well as to an assembly comprising such a fluidic module.

TECHNICAL BACKGROUND

Biomolecules are typically produced by cell culture (bacterial or eukaryotic cells). The biomolecules of interest thus produced must then be purified by various techniques in order to eliminate the impurities present in the production medium. Conventionally, they are subjected to at least one separation step, such as a chromatography step. Separation installations generally include one or more sets of valves for conveying and directing the solutions of biomolecules and the various fluids used for or generated by the separation step.

Thus, the document EP 1948339 B1 describes a chromatography device comprising a valve block, the said valve block comprising a central conduit connecting two connectors for connecting the valve block to a chromatography column or to a draw-off or feeding pipe, and several lateral conduits starting from the central conduit, with a valve being positioned in each of the central and lateral conduits.

The valve block described in this document presents the drawback of not being modifiable according to needs.

In other technical fields, various valve or fluid conveyance systems have been described.

The document FR 2896549 discloses a device for preparing compressed air that comprises a set of modular maintenance elements through which passes a fluid conduit intended for receiving the compressed air to be treated.

The document EP 2102509 B1 describes a valve device formed by assembling a plurality of modules by means of an anchor tie rod formed from a plurality of tie rod elements screwed together.

The document U.S. Pat. No. 6,892,763 describes a valve that includes a valve body comprising a plurality of conduits, mounted between two connection plates each comprising a connection conduit that communicates with one of the conduits of the valve body.

The document US 2013/0269791 describes a valve system for the distribution of hydrogen comprising functional units positioned one behind the other and each comprising a functional element mounted on a connection block, the connection blocks comprising an inlet and an outlet aligned with the inlet or outlet of the adjacent block.

The document US 2006/0027275 describes a modular system for the semiconductor industry comprising blocks with a fluid passage assembled using a fastening means that passes through the blocks.

The document U.S. Pat. No. 4,136,713 relates to a hydraulic circuit unit comprising a block that includes five parallel conduits passing through the block, certain of these conduits also being connected to a face of the block to which a valve is fixed.

There thus exists a real need to provide a fluidic module that can be assembled in a modularly customisable assembly that is compact and usable in an installation for the treatment of a biomolecule, as well as such a modularly customisable assembly, that is compact and usable in an installation for the treatment of a biomolecule.

SUMMARY OF THE INVENTION

The invention relates firstly to an assembly that includes at least:
 a first fluidic module comprising a block comprising:
  a first face configured so as to be assembled by contact with a face of another fluidic module block;
  one single central conduit opening onto the said first face or a plurality of central conduits opening onto the said first face;
  at least one lateral line connected to the central conduit or to one of the central conduits and having at least one fluid access port on a second face of the block not opposite to the first face, the said fluid access port being a fluid inlet or a fluid outlet;
  the said first fluidic module further comprising a first closure member configured so as to close or open the at least one lateral line; and
 a second fluidic module comprising a block comprising:
  a first face configured so as to be assembled by contact with a face of another fluidic module block, a second face, a third face and a fourth face;
  a first central conduit with one of its ends opening onto the first face, whereas the other of its ends does not open onto a face of the block;
  a first lateral conduit connected to the first central conduit and having an opening on the third face of the block;
  a second central conduit with one of its ends opening onto the fourth face, whereas the other of its ends does not open onto a face of the block; and
  a second lateral conduit connected to the second central conduit and having an opening on the third face of the block;
 the said second fluidic module further comprising a second closure member configured so as to close or open the opening of the first lateral conduit on the third face and/or the opening of the second lateral conduit on the third face;
 wherein the first face of each of the first and second fluidic modules is assembled with the face of a block of another fluidic module by contact between the two faces.

In some embodiments, the lateral line of the first fluidic module includes at least:
 a first lateral conduit connected to the central conduit or to one of the central conduits and having an opening on a third face of the block; and
 a second lateral conduit having an opening on the said third face of the block and at least one opening on the second face of the block forming the fluid access port;
 wherein the first closure member is configured so as to close or open the opening of the first lateral conduit on the third face and/or the opening of the second lateral conduit on the third face.

In some embodiments, the first fluidic module includes at least two lateral lines, each connected to the central conduit or to one of the central conduits that may be identical or different, and having a fluid access port on a second face of the block not opposite to the first face, that may be identical or different, the said first fluidic module comprising a closure member configured so as to close or open each of the at least two lateral lines.

In some embodiments, the first faces of the first module and the second module are planar.

In some embodiments, the fourth face of the second fluidic module is configured so as to be assembled by contact with a face of another fluidic module block, and is preferably planar, the fourth face of the second fluidic module preferably being opposite to the first face of the second fluidic module.

In some embodiments, the central conduit or at least one of the central conduits of the first fluidic module opens onto a fourth face of the block that is different from the first face, preferably opposite to the first face.

In some embodiments, the fourth face of the block of the first fluidic module is configured so as to be assembled by contact with the face of another fluidic module block; preferably the fourth face is planar.

In some embodiments, the central conduit or at least one of the central conduits of the first fluidic module is not through-passing not opening onto a face of the block.

In some embodiments, the first closure member configured so as to close or open the at least one lateral line of the first fluidic module is the obturator of a valve; preferably each lateral line of the first fluidic module is able to be independently closed or opened by means of a valve.

In some embodiments, the second closure member of the second fluidic module is the obturator of a valve.

In some embodiments, the valve(s) are selected from the group consisting of pinch valves, needle valves, ball valves, flap gate valves and diaphragm valves, and are more preferentially diaphragm valves.

In some embodiments, the block of at least one of the first and second fluidic modules is of single-use type, more preferentially the block and the closure member of at least one of the first and second fluidic modules are of single-use type, even more preferentially the blocks of the first and second fluidic modules are of single-use type, even more preferentially the blocks and the closure members of the first and second fluidic modules are of single-use type.

In some embodiments, the first fluidic module includes at least one sensor and/or one transmitter inserted in the block of the said fluidic module.

In some embodiments, the assembly includes from 2 to 20 fluidic modules.

In some embodiments, a seal is present between the faces of the blocks assembled by contact.

In some embodiments, the fluidic modules are assembled by means of at least one tie rod, preferably at least two tie rods, more preferably three tie rods, traversing through the blocks of the fluidic modules.

In some embodiments, at least one fluidic module is assembled to an end plate by contact between the end plate and a face of the block of the fluidic module.

The invention also relates to a device comprising at least one assembly as described above, wherein the fluid access port of the lateral line of the first fluidic module is connected to a lateral fluid pipe, the said lateral fluid pipe preferably being connected to another fluidic module, more preferably to a fluidic module included in a second assembly of fluidic modules, more preferentially in a second assembly as described above.

The invention also relates to a separation installation, preferably for separation by chromatography, that comprises the device as described above connected to at least one separation device, preferably a chromatography column.

The invention also relates to the use of an assembly as described above, or a device as described above, for the conveying of fluid in a biomolecule purification installation, in particular for purification by chromatography.

The invention also relates to a fluid conveyance method for conveying fluid in a biomolecule purification installation, in particular for purification by chromatography, including:
  providing of an assembly as described above, or a device as described above; and
  circulating of the said fluid within the said assembly or device.

The present invention makes it possible to meet the above stated need. It more particularly provides a fluidic module that is capable of being assembled with other fluidic modules in a manner so as to form a compact, sealed assembly, which is modularly customisable according to needs and can be connected to the elements of an installation for treating a biomolecule, such as to one or more chromatography columns.

This is accomplished thanks to: the presence in the fluidic module, of a block comprising a face configured so as to be assembled by contact with the face of another fluidic module block, that enables a compact assembly and requires less piping; and to the presence in the block, of at least one central conduit and at least one lateral line which can be closed or opened, thereby enabling the conveyance and distribution of a fluid.

It also provides a compact, sealed assembly that is modularly customisable according to needs and can be connected to the elements of an installation for treating a biomolecule, such as to one or more chromatography columns.

This is accomplished thanks to: the use of at least two fluidic modules whose blocks are assembled by contact with the block of another fluidic module, that enables a compact assembly and requires less piping. In addition, the two fluidic modules each have a block with a particular configuration and a closure member that enable the conveying and distribution of a fluid.

DETAILED DESCRIPTION

Figure 1:
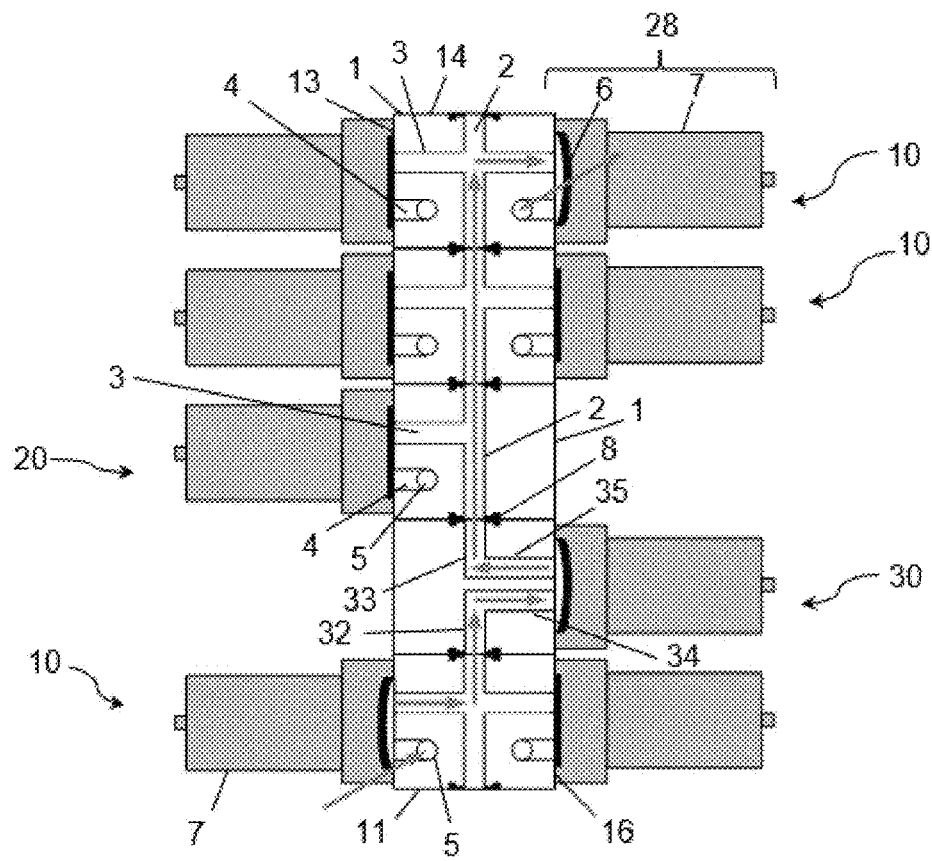
FIG. 1 represents a schematic sectional view of an exemplary assembly of fluidic modules according to the invention.

The invention is described hereinafter in greater detail and in a non-limiting manner in the description that follows.

Fluidic Module

The invention relates firstly to a fluidic module comprising a block, the said block including at least one face (referred to as "first face" in the present text) configured so as to be assembled by contact with the face of another fluidic module block. In other words, the block of the fluidic module is capable of being assembled with the block of another fluidic module via a face-to-face connection. In an advantageous manner, the first face configured so as to be assembled by contact with the face of another fluidic module block is planar or essentially planar.

Preferably, the block includes at least two faces (referred to as "first face" and "fourth face" in the present text) configured so as to be each assembled by contact with the face of another fluidic module block. More preferably, the first face and the fourth face are the opposite faces of the block. In some embodiments, the block may include 1, or 2, or 3, or 4, or 5, or 6, or more, faces configured so as to be assembled by contact with the face of another fluidic module block, for example all of the faces of the block may be configured so as to be assembled by contact with the face of another fluidic module block (which makes possible a three-dimensional type assembly).

The block may have any suitable shape. In particular, the block may comprise independently concave, convex, planar or essentially planar faces. In a particularly advantageous manner, all of the faces of the block are planar or essentially planar. Preferably, the block has a parallelepipedal or essentially parallelepipedal shaped form. Alternatively, the block may for example have a cylindrical form, or an essentially cylindrical form, preferably a straight cylindrical form (the first face and the fourth face, described in more detail below, being orthogonal to the axis of the cylinder, and the block further comprising for example two planar, preferably opposite faces, which preferably correspond to the third face and to the sixth face as described below), or a pyramidal shaped form.

The block may comprise or be made of metal, preferably stainless steel, and/or of plastic material, such as polypropylene (PP), polytetrafluoroethylene (PTFE), perfluoroalkoxy (PFA), silicone polymers, polyphenylsulfone (PPSU) and/or polysulfones (PSU). The block may be fabricated by machining and/or moulding.

The block may have a length ranging from 30 mm to 300 mm, preferably from 50 mm to 90 mm, and/or a width ranging from 30 mm to 300 mm, preferably from 50 mm to 90 mm, and/or a depth ranging from 30 mm to 300 mm, preferably from 50 mm to 90 mm. The term "length" is understood to refer to the greatest of the dimensions of the block, and the term "depth" to the smallest dimension of the block.

The block comprises a central conduit. The central conduit has at least a first opening on a face of the block, preferably on the first face of the block.

The central conduit may comprise a second opening on another face of the block, this other face preferably being the fourth face of the block and/or a face opposite to the face that includes the first opening. In these embodiments, the central conduit connects, via the interior of the block, the face that includes the first opening of the said central conduit and the face that includes the second opening of the said central conduit.

Alternatively, the central conduit only comprises one single opening on a face of the block. In other words, the central conduit is "non-through-passing", that is to say that it stops within the interior of the block rather than passing through to open out on to another face of the block and in particular on to a face opposite to the face that includes the first opening of the said central conduit.

The opening(s) of the central conduit may be centred on the face on which they are located. Alternatively, they may each independently be off-centre. Thus, the central conduit may have a longitudinal axis that is offset (but preferably parallel) relative to a central axis of the block.

The block may comprise one single central conduit or may comprise a plurality of central conduits, such as at least two central conduits, for example two central conduits, or 3, or 4, or more, central conduits. When the block comprises a plurality of central conduits, they all have at least a first opening on the same face of the block, preferably on the first face of the block. Each central conduit may be as described above. In particular, each of the central conduits may be independently through-passing or non-through-passing. Preferably, when a plurality of central conduits are present, they are either all through-passing opening, in particular onto the fourth face, in particular onto the face opposite to the face that includes their first opening; or all non-through-passing. In addition, when the block comprises a plurality of central conduits, preferably they are not in fluid connection with each other in a manner essentially internal to the block (or are said to be "unconnected"), that is to say that a fluid cannot flow from one to the other—this being so on a permanent basis—by passing essentially through the interior of the block. The term "fluid connection in a manner essentially internal to the block" is understood to refer to a fluid connection which is not effected via a fluid conduit present on the exterior of the block; on the other hand, such a fluid connection essentially internal to the block includes a fluid connection effected via a valve present on the face of the block.

The block also comprises at least one lateral line comprising a fluid access port on one face of the block (referred to as "second face" in this text). The term "fluid access port" is understood to refer to an orifice that is able to, or configured so as to, be connected to a fluid supply or fluid draw-off pipe. Thus, a fluid access port differs from an opening intended to supply the fluid which passes through it to an element, such as a valve that enables interruption of the passage of the fluid or a measuring device, before the said fluid is reintroduced into the block.

The fluid access port may be a fluid inlet, that is able to, or configured so as to, be connected to a fluid supply line, or a fluid outlet, that is able to, or configured so as to, be connected to a fluid draw-off conduit.

The second face that includes the fluid access port may be the first face or the fourth face but, in a particularly preferred manner, it is different from the first face, and preferably different from the fourth face. In a particularly preferred manner, the second face where the fluid access port is located is not a face opposite to the face that includes the first opening of the central conduit or the central conduits (which is advantageously the first face).

For the purposes of the present invention, a "line" may be direct or interrupted or not by one or more elements such as valves or measuring instruments (for example sensors or transmitters), and may comprise one or more conduits. It may include parts located on the exterior of the block or be totally within the interior of the block. For the purposes of the present invention, a "conduit" denotes a channel formed entirely within the interior of the block. The conduits may have any possible path, and in particular be straight or angled.

The lateral line is connected by one of its ends to the central conduit or to one of the central conduits. When the central conduit is non-through-passing, the lateral line may be connected to the central conduit at its non-through-passing end. Preferably, the lateral line is directly connected to the central conduit, that is to say the central conduit and the lateral line (or one of the conduits which form it) are joined to each other, directly, without an element or a part other than the bloc being necessary to form said connection. In a very advantageous manner, the connection between the lateral line and the central conduit is made within the interior of the block (i.e. the connection is such that a fluid flowing from the central conduit to the lateral line, or vice-versa, does so by passing through the interior of the bloc (without passing through the exterior of the bloc)).

The lateral line according to the invention is capable of being closed and opened (or capable of being subjected to closing or opening), that is to say that the fluidic module comprises a closure element that enables the interruption or resumption of flow of the fluid which the said lateral line contains. The closing and opening of the lateral line may take place at any site along the lateral line, for example at the fluid access port. Preferably, however, the closing and opening of the line takes place between the connection of the said lateral line to the central conduit and the fluid access port. In an advantageous manner, the closing and opening of the lateral line takes place on the exterior of the block.

In a more preferred manner, the lateral line comprises at least a first lateral conduit connected to the central conduit (or to one of the central conduits) and having an opening on a face of the block (referred to as "third face" in the present text) and a second lateral conduit having one opening on the said third face of the block and at least one opening on another face of the block, preferably the second face of the block, this opening forming the fluid access port of the lateral line. The third face may be the first face, the fourth face, or the second face, but in a particularly preferred manner it is different from the first face and/or (preferably and) from the fourth face and/or (preferably and) from the second face. Preferably, the first lateral conduit is directly connected to the central conduit (or to one of the central conduits) and, preferably, their connection takes place within the interior of the bloc.

Preferably, the fluidic module comprises a space provided on the exterior of the block, that ensures the fluid connection between the first lateral conduit and the second lateral conduit. This fluid connection can however be interrupted when the lateral line is closed. Preferably, the space in question is delimited by the face of the block (third face) and by the closure member.

Preferably, the closing and opening of the lateral line are effected at the opening of the first conduit on the third face and/or at the opening of the second conduit on the third face. More preferably, the closing of the lateral line is effected through the plugging, by the closure member, of the opening of the first conduit on the third face of the block, and/or of the opening of the second conduit on the third face of the block, more preferentially through the plugging, by the closure member, of the opening of the first conduit on the third face and of the opening of the second conduit on the third face. In these embodiments, the opening of the lateral line is effected through the unblocking, by the closure member, of the plugged opening(s), preferably through the unblocking of the opening of the first conduit on the third face and of the opening of the second conduit on the third face. In these embodiments, when the lateral line is open, the first lateral conduit and the second lateral conduit are in fluid communication and, preferably, the central conduit and the second lateral conduit are in fluid communication. The term "fluid communication" between two elements, is understood to indicate that a fluid, when it is present, is able to effectively flow from one element to another. When the lateral line is closed, the first lateral conduit and the second lateral conduit (and the central conduit and the second lateral conduit) are not in fluid communication.

In an advantageous manner, the lateral line is closed or opened by means of a valve mounted on the block. Preferably, the valve comprises an actuator and an obturator, the actuator making it possible to operate the obturator. In these embodiments, the obturator of the valve is the closure member. The valve may be selected from the group consisting of pinch valves, needle valves, ball valves, flap gate valves and diaphragm valves. In a particularly advantageous manner, the valve is a diaphragm valve, that is to say the obturator (thus the closure member) is a diaphragm operated by an actuator. Preferably, the diaphragm covers both the opening of the first conduit of the lateral line on the third face and the opening of the second conduit of the lateral line on the third face. In the embodiments, the third face may be hollowed out in a manner so as to contain a location for the diaphragm.

The second conduit of the lateral line can include a third opening on a face of the block (referred to as "fifth face" in the present text). The fifth face may be the first face, the fourth face, the second face or the third face, but in a particularly preferred manner it is different from the first face and/or (preferably and) from the fourth face and/or (preferably and) from the second face, and/or (preferably and) from the third face. More preferably, the fifth face is opposite to the second face. Thus, for example, the second conduit of the lateral line may comprise a first conduit portion starting from the third face and thereafter dividing into two conduits respectively joining the second face and the fifth face. Preferably, this third opening is a fluid access port which can be a fluid inlet or a fluid outlet. In certain embodiments, the second conduit of the lateral line may include other openings on a face of the block (which may be identical to or different from one of the faces mentioned here above).

The block may comprise one or more mounting hole(s), preferably at least two or at least three, for assembling of the block to a block of another fluidic module. Preferably, when the block includes a plurality of mounting holes, they open out on the same face(s) of the block. The mounting holes are advantageously present at least on the first face of the block. In a particularly preferred manner, the mounting holes pass through the block and open out on another face, preferably on a face opposite to the first face, preferably on the fourth face. The mounting holes preferably have a longitudinal axis parallel to the longitudinal axis of the central conduit. In some embodiments, the first face includes three mounting holes disposed on the said face in a triangular configuration around the opening of the central conduit. In other embodiments, the first face comprises two mounting holes disposed on the said face on either side of the opening of the central conduit such that the two mounting holes and the opening of the central conduit are aligned. Preferably, the mounting holes are configured so as to accommodate respective tie rods.

In other embodiments, the block does not comprise mounting holes.

The block may comprise, on the first face, at least one raised part (male part) and/or one recessed part (female part) intended to fit together with, respectively, a corresponding female part and a corresponding male part situated on the face of another block. The block may comprise one (or more) such male part(s) and/or one (or more) such female part(s) on all of its faces which are configured so as to be assembled by contact with the face of another fluidic module block (for example on the fourth face), or on all of its faces. These male/female parts are used to help properly position/center the blocks of the fluidic modules relative to each other when they are assembled together. The male parts and the female parts may have any suitable shape. They may for example have a transverse cross section having square, oval, circular or annular form, preferably annular form. The male part and/or the female part may be situated at any site on the face of the block. Preferably, the first face and/or the fourth face comprise, around the opening of the central conduit (or of one or more of the central conduit(s), or of the central conduits), a groove, as a female part, intended for receiving a raised washer situated on a face of the block of another fluidic module, or a raised washer, as a male part, intended to fit into a groove situated on one face of the block of another fluidic module. For example, the block of the fluidic module according to the invention may comprise a groove around the opening of the central conduit (or of one or more of the central conduit(s), or of the central conduits) on its first face and a raised washer around the opening of the central conduit (or of one or more of the central conduit(s), or of the central conduits) on its fourth face, when the central conduit(s) are through-passing. The block may further include another male and/or female part elsewhere on its first and/or fourth face.

The block may comprise, on its first face, a groove around the opening of the central conduit (or of one or more of the central conduit(s), or preferably of the central conduits) intended for receiving a seal. When the central conduit (or the central conduits) is(are) through-passing opening onto another face of the block (for example the fourth face), the block may include a groove on the said other face, around the opening of the central conduit (or of one or more of the central conduit(s), or preferably of the central conduits). When the first face and/or the fourth face also include a groove around the opening of the central conduit (or the central conduits) as a female part in order to aid in the centring of the block, the two grooves are preferably concentric and the groove intended for receiving a seal is preferably in an internal position relative to the female part groove, more preferably as close as possible to the periphery of the opening of the central conduit.

The block may comprise at least two lateral lines as described above, or at least three, or at least four, lateral lines as described above. Thus the block may include 1, or 2, or 3, or 4, or 5, or 6, or more, lateral lines.

When the block comprises a plurality of lateral lines as described above and a plurality of central conduits, the lateral lines may be connected to the same central conduit or to different central conduits. Preferably, each central conduit is connected to at least one lateral line as described above.

In certain embodiments, the block comprises one single lateral line. In other embodiments, the block includes two lateral lines. When the block includes two lateral lines, the second lateral line may comprise at least a first lateral conduit connected to the (or to one) central conduit and having an opening on a face of the block (referred to as "sixth face" in the present text) and a second lateral conduit having an opening on the said sixth face of the block and at least an opening on another face of the block, this opening forming the fluid access port. Preferably, the fluid access port, or a fluid access port, of the second lateral line is present on the second face that includes the fluid access port, or a fluid access port, of the first lateral line. In an alternative manner, the fluid access port, or a fluid access port, of the second lateral line may be present on another face of the block (for example the fifth face), preferably on a face not opposite to the face that includes the first opening of the central conduit or the central conduits, more preferentially on a face opposite to the second face. When the two lateral lines each include two fluid access ports (or at least two fluid access ports), preferably one fluid access port of the first lateral line and one fluid access port of the second lateral line are on the same face of the block, preferably the second face, and the other fluid access port (or another fluid access port) of the first lateral line and the other fluid access port (or another fluid access port) of the second lateral line are on the same face of the block, preferably the fifth face.

The sixth face may be the first face, the fourth face, the second face, the fifth face, or the third face, but in a particularly preferred manner it is different from the first face and/or (preferably and) from the fourth face and/or (preferably and) from the second face and/or (preferably and) from the fifth face and/or (preferably and) from the third face. More preferentially, the sixth face is opposite to the third face.

In other embodiments, the second lateral line may comprise at least a first lateral conduit connected to the (or to a) central conduit and having an opening on the third face of the block (that includes the opening of the first lateral conduit of the first lateral line) and a second lateral conduit having an opening on the said third face of the block and at least one opening on another face of the block forming a fluid access port. Preferably, in these embodiments, the fluid access port, or a fluid access port, of the second lateral line is present on the second face that includes the fluid access port, or a fluid access port, of the first lateral line. In an alternative manner, the fluid access port, or a fluid access port, of the second lateral line may be present on another face of the block (for example the fifth face), preferably on a face not opposite to the face that includes the first opening of the central conduit or the central conduits, more preferentially on a face opposite to the second face. When the two lateral lines each comprise two fluid access ports (or at least two fluid access ports), preferably one fluid access port of the first lateral line and one fluid access port of the second lateral line are on the same face of the block, preferably the second face, and the other fluid access port (or another fluid access port) of the first lateral line and the other fluid access port (or another fluid access port) of the second lateral line are on the same face of the block, preferably the fifth face.

When the block comprises more than two lateral lines, the second and subsequent lateral lines may independently include at least a first lateral conduit connected to the central conduit and having an opening on the third face or the sixth face of the block and a second lateral conduit having an opening on the said third face or sixth face of the block respectively and at least an opening on another face of the block forming a fluid access port (wherein this face may independently be, in particular, the second face and/or the fifth face).

The fluidic module according to the invention may comprise at least one measuring instrument, such as a sensor. In an advantageous manner, the at least one sensor is inserted at least partly in the block. Preferably, the at least one sensor is inserted at least partly in the central conduit or in one of the central conduits. In these latter embodiments, the sensor can thus perform a measurement on the fluid passing through the central conduit.

The sensor may be selected from the group consisting of pH sensors, conductometry sensors, pressure sensors, liquid presence sensors, air presence sensors, flow sensors, temperature sensors, UV sensors and Near-Infrared (NIR) sensors.

The fluidic module may comprise at least two sensors, in particular as described above. When the block comprises a plurality of central conduits, the at least two sensors may in particular be inserted, at least partly, in the same central conduit or in different central conduits. In some embodiments, the fluidic module includes a pH sensor and a conductivity sensor.

The fluidic module may comprise at least one, or at least two, transmitters. A transmitter is an electronic device that serves to convert the raw signal originating from the sensor into a converted signal that can be read by the automatic control unit.

The openings of the conduits and lines of the block of the fluidic module, in particular the fluid access ports, may include a connector intended to connect the said opening to a pipe for supplying fluid or for drawing-off fluid, or to any other element of an installation. In a preferred manner, the face(s) of the block of the fluidic module configured so as to be assembled by contact with the face of another fluidic module block do not include such connectors. The connector (fitting) may be a tulip connector, a tri clamp connector, a micro-clamp connector, a Hi-Tech Components (HTC) connector, a BVCO connector (surface seal fitting), a compression connector, a screw connector, a weld-in connector, or a barbed connector.

The conduits of the block (regardless of whether they are the central conduit or conduits, or the lateral conduits, etc) may independently (or all) have cylindrical or essentially cylindrical form, or any other suitable form. They may independently (or all) have a transverse cross section that is constant or that varies along their respective longitudinal axis.

In an advantageous manner, the actuators of the valves (when they are present in the fluidic module) are independently removable, and preferably are all removable, relative to the obturator of the valve and relative to the block. Preferably, the disassembly of the actuator from the obturator can be performed by an operator within a period of less than or equal to 5 seconds. The actuator can for example be assembled with the obturator of the valve by means of a flange, for example tightened by using a wing screw.

Preferably, the sensors and/or transmitters (when present in the fluidic module) are independently removable, and preferably are all removable, relative to the block.

Preferably, in use, only the block of the fluidic module and the closure member (the obturator of the valves, when one or more valves are present) are in contact with the fluid circulating within the fluidic module. The elements in contact with the fluid (such as the block and the closure member(s)) may be reusable and may be cleaned after use. However, in an advantageous manner, the block of the fluidic module may be of single-use type. Even more advantageously, the block of the fluidic module and the closure member (preferably the obturator of the valve(s), for example the diaphragm of the valve(s)) are of single-use type. These elements of the fluidic module being intended to be in contact with the fluid passing through the said module, this makes it possible to avoid the need for cleaning such elements after their use.

Preferably, the actuators of the valves and/or the sensors and/or the transmitters are reusable.

In an advantageous manner, during the disassembly of the removable elements of the fluidic module, such as the actuators and/or the sensors and/or transmitters, the fluid possibly present in the module is contained within the interior of the block, preferably by the closure members, in a manner such that the operator performing the disassembly is not in contact with the said fluid.

In an advantageous manner, the block of the fluidic module is adapted so as to contain a fluid having a pressure that can range up to 0.6 MPa, preferably a fluid having a pressure that can range up to 2 MPa.

Assembly of Fluidic Modules

The invention also relates to an assembly comprising at least one first fluidic module as described above and at least one second fluidic module.

The second fluidic module may be any fluidic module comprising a block comprising at least one face configured so as to be assembled by contact with the face of another fluidic module block. In particular, the second fluidic module may be a fluidic module as described in the previous section. The second fluidic module may alternatively be a central valve fluidic module or a measurement fluidic module, described in more detail below. In a general manner, the second fluidic module is preferably defined in that it includes a block comprising:
  a first face configured so as to be assembled by contact with a face of another fluidic module block;
  at least one central conduit opening onto the said first face.

In the assembly according to the invention, the first fluidic module is assembled with the second fluidic module by contact between the face (or one of the faces) thereof configured so as to be assembled by contact with the face of another respective fluidic module block.

In a preferable manner, the assembly comprises from 2 to 20 fluidic modules. In some embodiments, the assembly includes 2, or 3, or 4, or 5, or 6, or 7, or 8, or 9, or 10, or 11, or 12, or 13, or 14, or 15, or 16, or 17, or 18, or 19, or 20 fluidic modules. All of the fluidic modules in the assembly may be a fluidic module as described above, or only some of them, or only one of the fluidic modules, may be a fluidic module as described above.

In a particularly preferred manner, the assembly according to the invention includes at least one central valve fluidic module, as described below.

Preferably, all of the fluidic modules have at least one face configured so as to be assembled by contact with the face of another fluidic module block. The fluidic modules may have 2, or 3, or 4, or 5, or 6, or more, faces configured so as to be assembled by contact with the face of another fluidic module block. In a particularly preferred manner, all of the fluidic modules are assembled to each other by contact between one face of their respective block with one face of the block of the adjacent fluidic module. In an advantageous manner, the fluidic modules may be assembled one behind the other, so as to form a column of fluidic modules (each fluidic module block being assembled, preferably by contact, with one or two other fluidic module blocks). However, the assembly according to the invention may have any other configuration, and extend in any spatial direction, wherein the blocks can for example be assembled, preferably by contact, with a number of blocks ranging from one to the number of faces of the block.

Preferably, all of the fluidic modules of the assembly have a block comprising at least one central conduit. Preferably, the openings of the central conduits situated on the faces assembled together face each other, more preferentially, the central conduits of the blocks of the fluidic modules of the assembly are aligned with each other, such that a fluid is able to circulate from the central conduit of one block to the central conduit of an adjacent block. In particular, the central conduit (or at least one of the central conduits) of the first fluidic module is advantageously aligned with one of the central conduits of a central valve fluidic module.

The assembly may comprise a seal between the faces of two blocks assembled by contact between their faces. In an advantageous manner, in each assembly, by contact, of the faces of two adjacent blocks, a seal is present between the said assembled faces. The seal is preferably arranged around the central conduit (or a central conduit, or preferably the central conduits) and is advantageously annular. Preferably, the seal is placed in a groove present in one of the assembled faces, preferably in the two assembled faces. The seal may for example be an O-ring, a flat seal or a clamp seal. The presence of a seal between two assembled faces, and in particular around the openings of the central conduits of the blocks, makes it possible to enhance the tightness of the assembly, or even to ensure total tightness of the assembly vis-à-vis fluids circulating within the interior thereof.

The assembly preferably comprises a so-called "central valve" fluidic module. This module preferably includes a block comprising at least four faces (at least one first face, one second face, one third face, and one fourth face), more preferentially at least 6 faces. The block preferably includes at least one first central conduit, with one of its ends opening onto the first face, which is advantageously configured so as to be assembled by contact with the face of another fluidic module block, and its other end being non-through-passing. Preferably, the block includes at least one first lateral conduit connected to the said first central conduit and having an opening on a face of the block (referred to as "third face" in the present text), this opening not being a fluid access port. The block of the central valve fluidic module preferably includes at least one second central conduit, with one of its ends opening onto a face of the block (referred to as "fourth face" in the present text), which is advantageously configured so as to be assembled by contact with the face of another fluidic module block and, in an even more advantageous manner, is opposite to the first face, and with its other end being non-through-passing. Preferably, the block includes at least one second lateral conduit connected to the said second central conduit and having an opening on the third face of the block, this opening not being a fluid access port. The central valve fluidic module further includes at least one closure element and the first lateral conduit and/or (preferably and) the second lateral conduit are capable of being closed or opened by this closure element, preferably at their opening on the third face, for example as it is described above in relation to the lateral line of the fluidic module according to the invention (in particular by plugging and unblocking of the openings), preferably by means of a valve, more preferably a valve as described above, more preferentially a diaphragm valve. When the first and second lateral conduits are open, the first central conduit and the second central conduit are in fluid communication via the first lateral conduit and the second lateral conduit. When one of the lateral conduits, preferably the two of them, are closed, the first central conduit and the second central conduit are not in fluid communication.

The assembly may comprise a so-called "measurement" fluidic module. This module preferably includes at least one central conduit, with one of its ends opening onto a first face, which is advantageously configured so as to be assembled by contact with the face of another fluidic module block, and, with its other end opening onto a face of the block (referred to as "fourth face" in the present text), which is advantageously configured so as to be assembled by contact with the face of another fluidic module block and, in an even more advantageous manner, is opposite to the first face. The central conduit is (or the central conduits are) connected to one or more housing(s) intended for receiving a measuring instrument such as a sensor and/or a transmitter.

Preferably, all of the fluidic modules of the assembly are selected from the fluidic modules described in the previous section, one or more central valve fluidic module(s), and one or more measurement fluidic module(s).

The assembly may comprise a fluidic module comprising a filtre, a chromatography column and/or a pump.

The assembly may comprise fluidic modules that are identical or different from one another. In particular, the first fluidic module and the second fluidic module can be different from each other.

The assembly may comprise one or more end plates, preferably two end plates, preferably comprising at least one planar face. Preferably, the end plate, or at least one end plate, or each of them, is(are) assembled with a face of the block of a fluidic module configured so as to be assembled by contact with the face of another fluidic module block. More preferably, the end plate, or at least one end plate, or each of them, is(are) assembled by contact between the end plate and the face of the block of the fluidic module. In a particularly preferred manner, the assembly includes two end plates: one end plate at the inlet of the assembly, that is to say adjacent to the block of the first fluidic module of the assembly, preferably assembled with the first face of this block, and the second end plate at the outlet of the assembly, that is to say adjacent to the block of the last fluidic module of the assembly, preferably assembled with the fourth face of this block. Alternatively, the assembly may not include any end plates.

The fluidic modules may be assembled by any suitable means. In a preferred manner, a clamping means is used, making it possible to maintain in place together the fluidic modules of the assembly. This clamping means may be located, at least in part, within the interior of the blocks of the fluidic modules and/or may be, at least in part, on the exterior of the blocks of the fluidic modules. The clamping means may comprise at least one, preferably at least two, more preferentially at least three tie rods passing through at least two blocks of the assembly, preferably passing through the blocks of all the fluidic modules of the assembly. The term "tie rod" is understood to refer to a rod, being preferably metallic, which either may or may not be threaded, or only partially threaded. The tie rods traverse through the blocks by passing through the mounting holes of the blocks, which may be as described above. In these embodiments, all of the blocks through which the tie rod(s) traverse have mounting holes disposed in an identical manner relative to the central conduit (or to the central conduits). The use of tie-rods is advantageously combined with the use of a structure said to be "external" because it is located on the exterior of the blocks of the fluidic modules of the assembly (the clamping means thus then comprising one or more tie-rods and one or more external structures). Thus, preferably, the tie rods comprise a threaded part at one of their ends, preferably at both their two ends, on which a nut may be screwed on in order to maintain the blocks of the fluidic modules pressed tightly against each other. In an advantageous manner, when the assembly comprises one or more end plates, these latter include mounting holes, with the tie rods traversing through the end plates. The external structure more particularly may be a wing nut. The use of a wing nut allows the assembly to be tightly clamped together without tools, with just the force of hands. In some embodiments, the clamping means may be an unthreaded rod provided with a lever system.

Device

The invention also relates to a device comprising at least one fluidic module as described above wherein at least one fluid access port of at least one lateral line is connected to a lateral fluid pipe. Preferably, the said fluid pipe is also connected, whether or not directly, to the fluid access port of another element, such as a chromatography column or a second fluidic module, preferably a fluidic module included in an assembly of fluidic modules. The second fluidic module may be as described above.

The invention also relates to a device comprising at least one first assembly as described above wherein at least one fluid access port of at least one lateral line of at least one fluidic module is connected to a lateral fluid pipe.

Preferably, the said fluid pipe is also connected, whether or not directly, to the fluid access port of another element, such as a chromatography column or a fluidic module, more preferably a fluidic module included in a second assembly of fluidic modules. The fluidic module may be a fluidic module as described above. The second assembly of fluidic modules is advantageously an assembly as described above.

The device according to the invention may comprise a plurality of lateral pipes connected to a plurality of fluid access ports of the same given fluidic module and/or of a plurality of different fluidic modules of the first assembly.

The device may comprise at least two, or at least three, or at least four, fluidic modules, of which at least one is as described above, which are connected to each other by at least one lateral pipe. When the device comprises more fluidic modules connected by a fluid pipe, these modules can each be connected, by a fluid pipe, to all of the fluidic modules, or to some of them, or to one single other fluidic module.

In particular, the device may comprise at least two, or at least three, or at least four, assemblies of fluidic modules, of which at least one is as described above, which are connected to each other by at least one lateral pipe. When the device comprises more than two assemblies, these assemblies can each be connected, by a fluid pipe, to all of the assemblies, or to some of them, or to one single other assembly.

In some embodiments, all the fluidic modules of the device that are connected to each other by at least one fluid pipe, are fluidic modules as described above and/or all the assemblies of the device, that are connected to each other by at least one fluid pipe, are assemblies as described above.

The (or certain) lateral fluid pipes of the device may be parallel to and/or may cross each other.

The lateral fluid pipe(s) may be made of plastic material, such as polypropylene (PP), polytetrafluoroethylene (PTFE), perfluoroalkoxy (PFA), silicone polymers, polyphenylsulfone (PPSU), and/or polysulfones (PSU), and/or made of metal, such as stainless steel.

The lateral fluid pipe(s) may be connected to the fluid access port of the fluidic module by means of a clamp, a flange, a screw connection, or a quick connect. The term "quick connect" is understood to refer to a connection effected without the use of a tool, by inserting the fluid pipe into the orifice of the fluid access port (for example, into the orifice of the connector of the fluid access port).

Uses

The invention also relates to a separation installation (for example a chromatography installation) comprising at least one fluidic module as described above, or at least one assembly of fluidic modules as described above, or at least one device as described above, and at least one separation device, such as a chromatography column. Alternatively, or additionally, the separation device may be a filtration device, such as a cross-flow filtration device or a dead-end filtration device.

The invention also relates to the use of a fluidic module as described above, or an assembly of fluidic modules as described above, or a device as described above for the conveying of fluid in a biomolecule purification installation, in particular for purification by chromatography.

The invention also relates to a fluid conveyance method for conveying fluid in a biomolecule purification installation, in particular for purification by chromatography, the method comprising:
  providing of a fluidic module as described above, or an assembly of fluidic modules as described above, or a device as described above; and
  circulating of the said fluid within the said fluidic module, or the said assembly, or the said device.

Preferably, the biomolecule is selected from the group consisting of proteins and antibodies.

Fluidic Module with Two Lateral Lines and Assembly

According to a more specific aspect, the invention also relates to a fluidic module comprising a block comprising:
  a first face configured so as to be assembled by contact with a face of another fluidic module block;
  one single central conduit opening onto the said first face or a plurality of unconnected central conduits opening onto the said first face;
  at least one first lateral line connected to the central conduit or to one of the central conduits and having at least one fluid access port on a second face of the block, the said fluid access port being a fluid inlet or a fluid outlet;
  at least one second lateral line connected to the central conduit or to one of the central conduits (identical to or different from the conduit to which the first line lateral is connected), and having at least one fluid access port on a face of the block, the said fluid access port being a fluid inlet or a fluid outlet;
  the said fluidic module further comprising a first closure member configured so as to close or open the at least one first lateral line and a second closure member, different from the first closure member, configured so as to close or open the at least one second lateral line.

In the fluidic module as described above, the first and second closure members may be mounted on a face of the block, the second closure member being mounted on a face different from the face on which the first closure member is mounted, preferably opposite to the face on which the first closure member is mounted.

In the fluidic module as described above, the first lateral line may comprise at least:
  a first lateral conduit connected to the central conduit or to one of the central conduits and having an opening on a third face of the block; and a second lateral conduit having an opening on the said third face of the block and at least an opening on the second face of the block forming the fluid access port;

the first closure member being configured so as to close or open the opening of the first lateral conduit on the third face and/or the opening of the second lateral conduit on the third face.

In the fluidic module as described above, the first face may be planar.

In the fluidic module as described above, the central conduit or at least one of the central conduits may be through-passing opening onto a fourth face of the block that is different from the first face, preferably opposite to the first face.

In the fluidic module as described above, the fourth face of the block may be configured so as to be assembled by contact with the face of another fluidic module block; preferably the fourth face is planar.

In the fluidic module as described above, the central conduit or at least one of the central conduits may be non-through-passing not opening onto a face of the block.

In the fluidic module as described above, the face of the block that includes the fluid access port of the at least one second lateral line may be: the same face as the face of the block that includes the fluid access port of the at least one first lateral line (the second face of the block); or a face opposite to the face that includes the fluid access port of the at least one first lateral line (a fifth face of the block).

In the fluidic module as described above, the second lateral line may comprise at least:
  a first lateral conduit connected to the central conduit or to one of the central conduits and having an opening on a sixth face of the block; and
  a second lateral conduit having one opening on the said sixth face of the block and at least one opening on one face of the block (preferably the second face or the fifth face), the opening forming the fluid access port;
  the second closure member being configured so as to close or open the opening of the first lateral conduit on the sixth face and/or the opening of the second lateral conduit on the sixth face.

In the fluidic module as described above, the first closure member configured so as to close or open the at least one first lateral line may be the obturator of a valve, and/or the second closure member configured so as to close or open the at least one second lateral line may be the obturator of a valve, preferably each lateral line is able to be independently closed or opened by means of a valve.

In the fluidic module as described above, the one or more valve(s) may be selected from the group consisting of pinch valves, needle valves, ball valves, flap gate valves and diaphragm valves, and are more preferentially diaphragm valves.

In the fluidic module as described above, the block may be of single-use type, more preferentially the block and the closure member are of single-use type.

The fluidic module as described above may comprise at least one sensor and/or one transmitter inserted in the block of the said fluidic module.

The invention also relates to an assembly comprising at least one fluidic module as described above, the first face of which is assembled with the face of a block of another fluidic module by contact between the two faces.

The assembly as described above may include from 2 to 20 fluidic modules.

In the assembly as described above, a seal may be present between the faces of the blocks assembled by contact.

In the assembly as described above, the fluidic modules may be assembled by means of at least one tie-rod, preferably at least two tie-rods, more preferably three tie-rods, traversing through the blocks of the fluidic modules.

In the assembly as described above, at least one fluidic module may be assembled to an end plate by contact between the end plate and a face of the block of the fluidic module.

The invention also relates to a device comprising at least one fluidic module as described above, wherein the fluid access port of at least one lateral line is connected to a lateral fluid pipe, the said fluidic module preferably being included in an assembly as described above.

In the device as described above, the lateral fluid pipe is preferably connected to another fluidic module, more preferably to a fluidic module included in an assembly of fluidic modules, more preferentially in an assembly as described above.

The invention also relates to a separation installation, preferably for separation by chromatography, that includes the device as described above connected to at least one separation device, preferably a chromatography column.

The invention also relates to the use of a fluidic module as described above, or an assembly as described above, or a device as described above, for the conveying of fluid in a biomolecule purification installation, in particular for purification by chromatography.

The invention also relates to a fluid conveyance method for conveying fluid in a biomolecule purification installation, in particular for purification by chromatography, including:
  providing of a fluidic module as described above, or an assembly as described above, or a device as described above; and
  circulating of the said fluid within the said fluidic module, or the said assembly, or the said device.

All that has been described in other sections of the present text may be applicable to the fluidic modules, assemblies, devices, installations, uses and methods described in this section; in particular the fluidic modules, assemblies, devices, installations, uses and methods described in this section may have any other feature(s) described in other sections of the present text.

Examples

Examples of fluidic modules, assemblies, devices and installations according to the invention are shown in FIGS. 1 to 12. These examples illustrate the invention without any limitation thereof.

Figure 2:
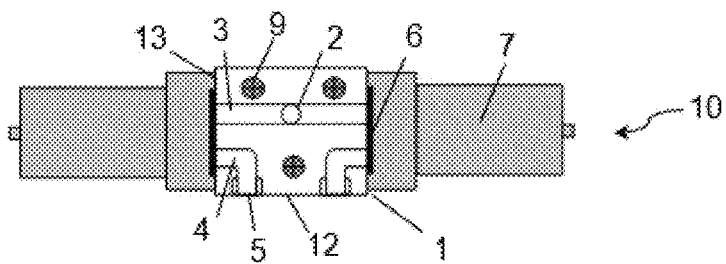
FIG. 2 represents a schematic top view of the assembly represented in FIG. 1.

FIGS. 1 and 2 represent an exemplary assembly of five fluidic modules assembled together face-to-face. This assembly comprises three fluidic modules 10 with two lateral lines (identical in this example), one fluidic module 20 with one lateral line, and one central valve fluidic module 30. Each fluidic module comprises a block 1 which preferably has a parallelepiped shape form. The fluidic modules 10 with two lateral lines comprise a central conduit 2 that passes through the block 1 from a first face 11 to a fourth face 14 (opposite to the first face 11). Connected to the central conduit 2 is a first lateral line comprising a first lateral conduit 3 opening onto a third face 13, and a second lateral conduit 4 connecting the third face 13 to a second face 12 of the block 1 where it forms a fluid access port 5. The fluidic modules 10 include a second lateral line that comprises a first lateral conduit connected to the central conduit 2 and opening onto a sixth face 16 of the block 1

(opposite to the third face 13), and a second lateral conduit connecting the sixth face 16 to the second face 12 of the block 1 where it forms a fluid access port. The fluidic modules 10 also include two valves 28 positioned respectively on the third face 13 and the sixth face 16 of the block 1, serving as means to close and open the first lateral line and the second lateral line respectively. The valves 28 comprise a diaphragm 6 that covers the openings, on the third face 13 and the sixth face 16 respectively, of the first and second lateral conduits of the lateral lines, and an actuator 7 enabling to press the diaphragm 6 against the said openings of the lateral conduits so as to plug them, or to detach the diaphragm 6 from the said openings so as to allow a passage of fluid between the first lateral conduit and the second lateral conduit.

The fluidic module 20 having one lateral line comprises, in its block 1, a central conduit 2 that passes through the block 1 of the module from a first face to a fourth face, and to which is connected one single lateral line comprising a first lateral conduit 3 connected to the central conduit 2 and opening onto a third face, and a second lateral conduit 4 having an opening on the third face and an opening on a second face which forms a fluid access port 5. On the third face of the block, a diaphragm valve is present, making it possible to close or open the lateral line by plugging or unblocking the openings of the first lateral conduit 3 and the second lateral conduit 4 on the third face.

The central valve fluidic module 30 comprises, in its block, a first central conduit 32 that is non-through-passing, starting from a first face, to which is connected a first lateral conduit 34 opening onto a third face of the block, and a second central conduit 33 that is non-through-passing, starting from a fourth face (opposite to the first face) to which is connected a second lateral conduit 35 opening onto the third face of the block. The fluidic module 30 comprises a diaphragm valve making it possible to plug the openings of the first and second lateral conduits 34 and 35 on the third face in order to prevent the passage of a fluid between the said first and second lateral conduits 34 and 35 or to unblock the said openings so as to allow the passage of a fluid between the said first and second lateral conduits 34 and 35.

The opening of the central conduit 2 on the first face 11 of each block faces the opening of the central conduit 2 on the fourth face 14 of the adjacent block (when present), such that the said central conduits 2 are in fluid communication. Seals 8, preferably clamp seals, are present between the faces of the assembled blocks, around the openings of the central conduits 2, in order to ensure the tightness of the assembly. The blocks are maintained in place together by the use of three tie rods 9, traversing through each of the blocks from the first face 11 to the fourth face 14 thereof. As shown in FIG. 2, the tie rods 9 are preferably parallel to the central conduits of the blocks and disposed in a triangular configuration, the central conduits being disposed between the tie rods 9.

In FIG. 1, the valve of the central valve fluidic module 30 is represented in open position, as are the left valve of the fluidic module 10 represented at the bottom of the assembly and the right valve of the fluidic module 10 represented at the top of the assembly. The other valves are represented in closed position. The trajectory of the fluid circulating within the assembly is represented by grey arrows.

Figure 3:
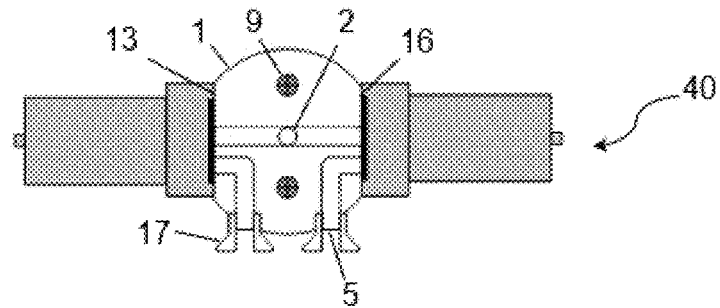
FIG. 3 represents a schematic top view of another exemplary assembly of fluidic modules according to the invention.

FIG. 3 shows a fluidic module 40 having two lateral lines included in an assembly. The block 1 of the fluidic module 40 has an essentially cylindrical form. The first face 11 and the fourth face 14 (not represented) are preferably planar, and orthogonal to the axis of the cylinder. Preferably, the cross section of the cylinder includes curved faces as well as two planar faces 13 and 16 (corresponding to the third face and the sixth face). The fluidic module 40 is assembled with the other fluidic modules of the assembly by means of two tie rods 9, preferably parallel to the central conduit 2, more preferably the transverse cross sections of the two tie rods 9 are aligned with that of the central conduit 2 and, even more preferably, are equidistant from the latter.

Figure 4:
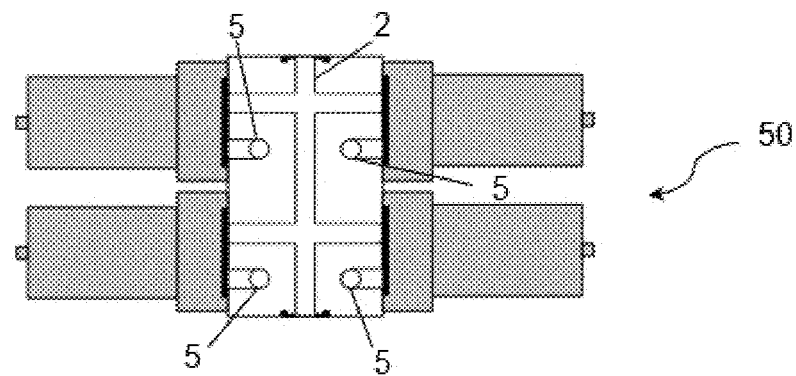
FIG. 4 represents a schematic sectional view of an exemplary fluidic module according to the invention.

FIG. 4 shows a fluidic module 50 having four lateral lines. The four lateral lines are each connected to the central conduit 2 and include, at their other end, a fluid access port 5. They each comprise a first lateral conduit and a second lateral conduit, and are each able to be opened or closed by means of an independent valve (herein a diaphragm valve).

Figure 5:
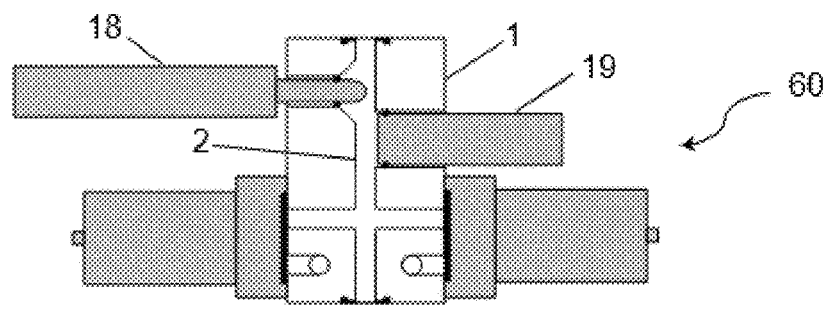
FIG. 5 represents a schematic sectional view of another exemplary fluidic module according to the invention.

FIG. 5 represents a fluidic module 60 having two lateral lines that are able to be opened or closed in an independent manner by a valve, such as a diaphragm valve. The fluidic module 60 further comprises a pH sensor 18 and a conductivity sensor 19 inserted in the block 1 of the fluidic module 60 and these two sensors are configured so as to perform a measurement on the fluid flowing within the central conduit 2.

Figure 6:
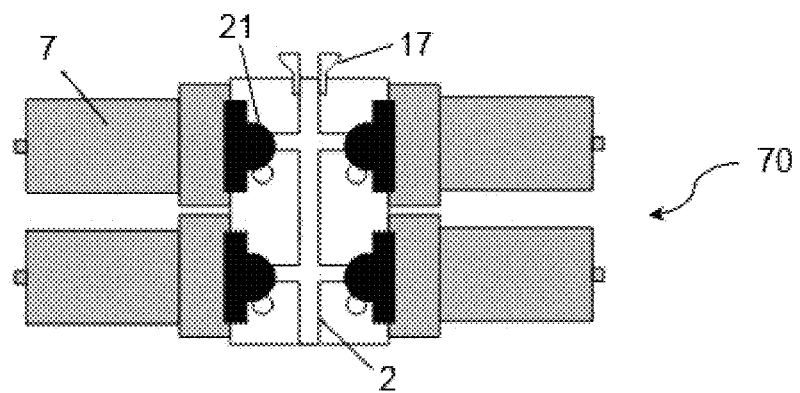
FIG. 6 represents a schematic sectional view of another exemplary fluidic module according to the invention.

FIG. 6 represents a fluidic module 70 having four lateral lines. Each lateral line may be opened or closed in an independent manner by a valve comprising an actuator 7 and an obturator 21 penetrating into the interior of a lateral conduit, or of the two lateral conduits, of each lateral line. The valve may be, for example, a needle valve or a flap gate valve. The fluidic module 70 represented in FIG. 6 comprises a tulip connector 17 at one of the openings of the central conduit 2.

Figure 7:
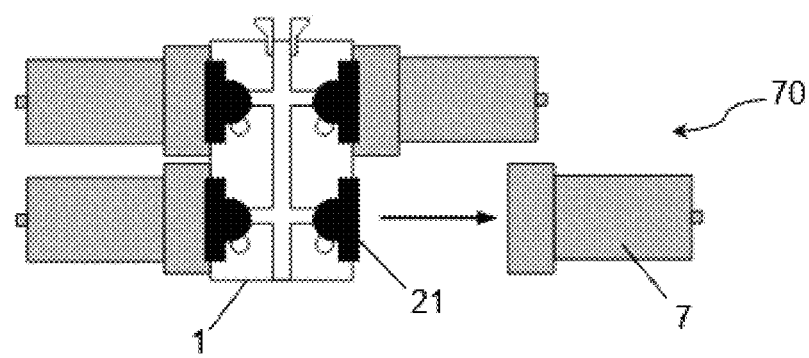
FIG. 7 represents a schematic sectional view of the fluidic module represented in FIG. 6 in another configuration.

FIG. 7 shows a fluidic module 70 as represented in FIG. 6 wherein the actuator 7 which is removable has been detached from its obturator 21 that has remained inserted in the block 1. Thus, the block 1 and the obturators 21 of the valves of the fluidic module 70 may be of single-use type and replaced after use while the actuators 7 of the valves may be reusable and installed on a new block, with a new obturator, after the module has been used.

Figure 8:
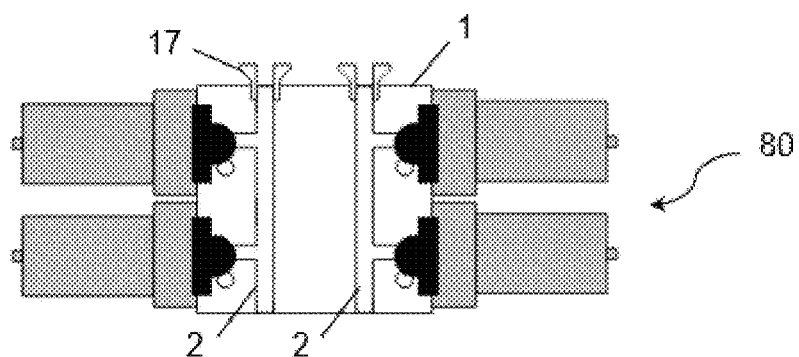
FIG. 8 represents a schematic sectional view of another exemplary fluidic module according to the invention.

FIG. 8 shows a fluidic module 80 having two central conduits 2, each being connected with two lateral lines. Each lateral line includes a first lateral conduit and a second lateral conduit comprising a fluid access port. Each of the four lateral lines may be closed or opened by means of a valve, for example a needle valve or flap gate valve. In this example, tulip connectors 17 are present at one of the openings of each of the two central conduits 2, the said openings being on the same face of the block 1.

Figure 9:
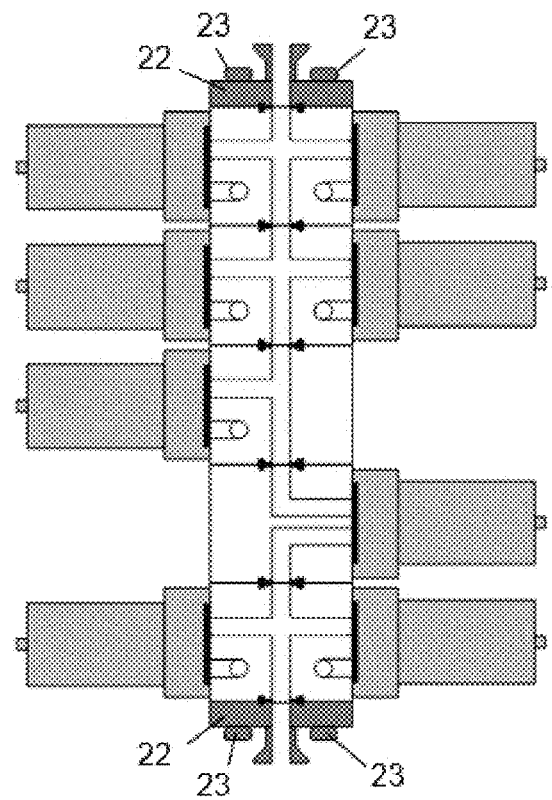
FIG. 9 represents a schematic sectional view of another exemplary assembly of fluidic modules according to the invention.

FIG. 9 represents an assembly of fluidic modules wherein the first fluidic module and last fluidic module are each assembled with an end plate 22, preferably through a face-to-face, contact assembly. The fluidic modules and the end plates are assembled together by means of tie rods traversing through them, on the ends of which is screwed a nut 23 tightened against the end plate 22.

Figure 10:
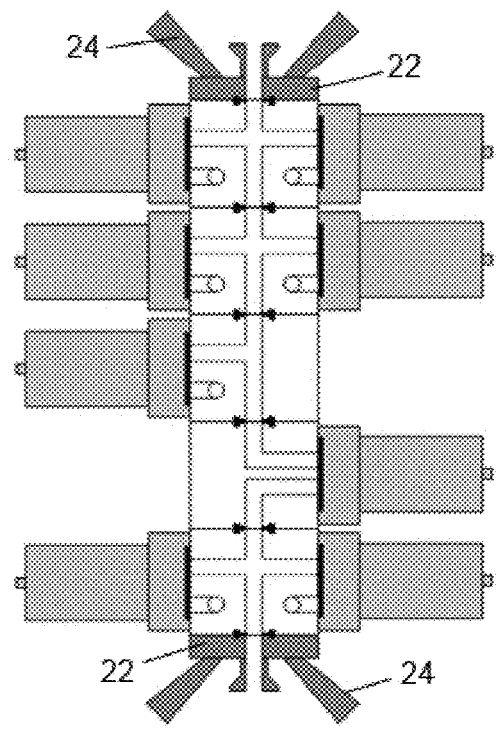
FIG. 10 represents a schematic sectional view of another exemplary assembly of fluidic modules according to the invention.

FIG. 10 represents an assembly of fluidic modules wherein the fluidic modules are assembled with two end plates 22 by making use of an external structure, which in this example is a wing nut 24, that enables the modules and end plates to be tightly clamped together. In this embodiment, the assembly preferably comprises one or more tie rods, on the ends of which are screwed the wing nuts 24.

Figure 11:
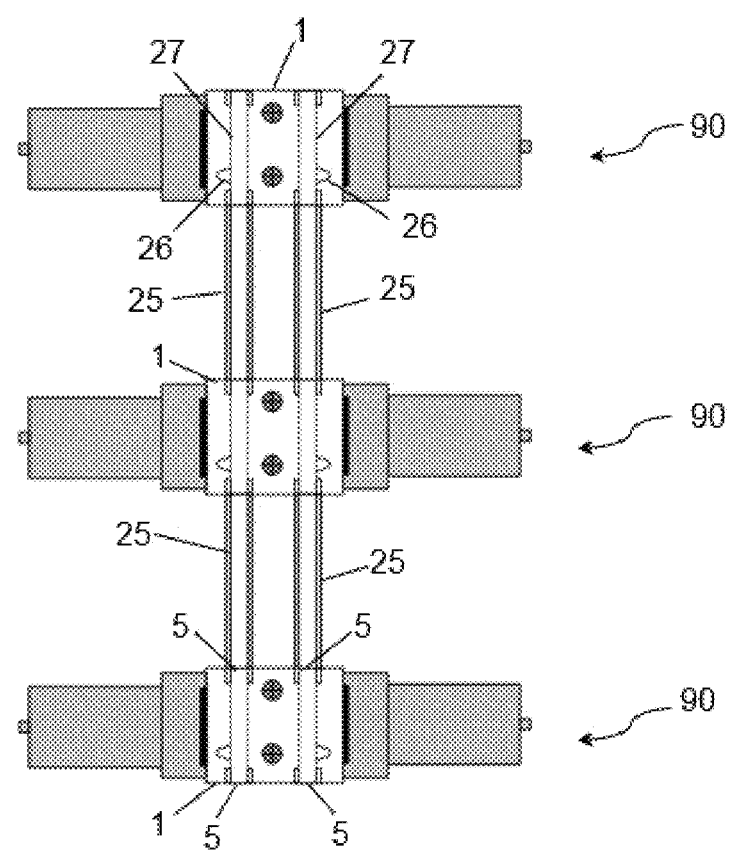
FIG. 11 represents a schematic top view of an example of a device of assemblies of fluidic modules according to the invention.

FIG. 11 represents a device comprising three fluidic modules 90, which may be identical or different (in this example they are identical). In this example, each of the fluidic modules 90 has at least two of its fluid access ports 5 to which respective lateral fluid pipes 25 are connected, making it possible to connect two fluidic modules to each other. In the example of device shown in FIG. 11, the three fluidic modules comprise a non-through-passing central conduit connected, at its non-through-passing end, to two lateral lines each comprising a first lateral conduit opening onto, respectively, a third face 13 and a sixth face 16 of the block 1 of the fluidic module 90, and a second lateral conduit. The second lateral conduit of each lateral line comprises a first conduit portion 26 starting, respectively, from the third face 13 and from the sixth face 16, and a second conduit portion 27 that is connected, preferably at an intermediate position between its ends, to the end of the first portion 26. The second portion 27 comprises an opening on a second face 12 of the block 1 forming a first fluid access port 5, and a second opening on a fifth face 15 of the block 1 forming a second fluid access port 5. The fluidic modules 90 may each independently, or all, be included in an assembly of fluidic modules (wherein preferably a plurality of fluidic modules are assembled together face-to-face), the fluidic modules 90 thus then preferably being at one end of the assembly.

Figure 12:
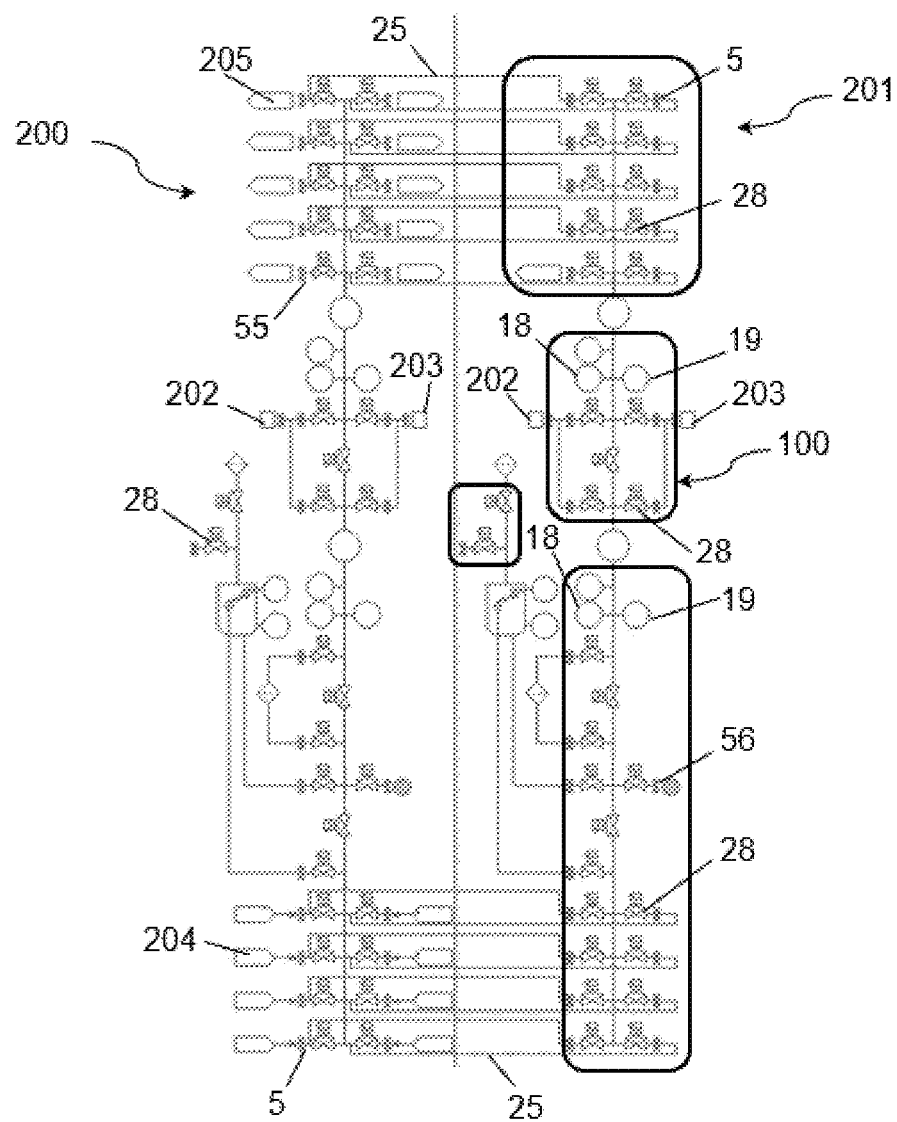
FIG. 12 represents in a schematic manner a chromatography installation comprising assemblies of fluidic modules according to the invention.

FIG. 12 represents a chromatography installation that includes two chromatography modules 200 and 201 comprising blocks of valves (enclosed within black rectangles on the second chromatography module 201) that may be assemblies of fluidic modules as described above. The chromatography modules 200 and 201 each include a chromatography column (not shown) comprising a fluid inlet 202 and a fluid outlet 203. The assemblies of fluidic modules can include valves 28 and sensors, such as pH sensors 18 and conductivity sensors 19. The assemblies of fluidic modules of the chromatography modules may be interconnected there-between by lateral fluid pipes 25 connected to the fluid access ports 5 of the fluidic modules of the assemblies. Some fluid access ports 5 of fluidic modules may be connected to supply pipes 204 and some fluid access ports 5 of fluidic modules may be connected to draw-off pipes 205. A fluid outlet 55 of an assembly of fluidic modules of a chromatography module 200 may be connected to a fluid inlet 56 of an assembly of fluidic modules of another chromatography module 201. Depending on the positions (open or closed) of the valves of the fluidic modules, the columns of the two chromatography modules 200 and 201 may be in series or in parallel. In addition, in each chromatography module 200 and 201, depending on the positions (open or closed) of the valves of the fluidic modules of the assembly 100 of fluidic modules connected to the fluid inlet 202 and to the fluid outlet 203 of the chromatography column, the said chromatography column may be on-line or may be bypassed.

The invention claimed is:

1. An assembly that includes at least:
a first fluidic module comprising a first block, the first block comprising:
a first face of the first block, the first face of the first block configured so as to be assembled by contact with a face of another fluidic module block;
one single central conduit opening onto the said first face of the first block or a plurality of central conduits opening onto the said first face of the first block, wherein the single central conduit or at least one of the plurality of central conduits of the first block also opens onto a face of the first block that is opposite to the first face of the first block;
at least one lateral line connected to the single central conduit or to one of the plurality of central conduits and having at least one fluid access port on a second face of the first block not opposite to the first face of the first block, the said fluid access port being a fluid inlet or a fluid outlet;
the said first fluidic module further comprising a first closure member configured so as to close or open the at least one lateral line; and
a second fluidic module comprising a second block, the second block comprising:
a first face of the second block, the first face of the second block configured so as to be assembled by contact with a face of another fluidic module block,
a second face of the second block,
a third face of the second block, and
a fourth face of the second block, wherein said fourth face of the second block is configured so as to be assembled by contact with a face of another fluidic module block, and is opposite to the first face of the second block;
a first central conduit with one end opening onto the first face of the second block, whereas a different end of the first central conduit does not open onto a face of the second block;
a first lateral conduit connected to the first central conduit and having an opening on the third face of the second block;
a second central conduit with one end opening onto the fourth face of the second block, whereas a different end of the second central conduit does not open onto a face of the second block; and
a second lateral conduit connected to the second central conduit and having an opening on the third face of the second block;
the said second fluidic module further comprising a second closure member configured so as to close or open the opening of the first lateral conduit on the third face of the second block and/or the opening of the second lateral conduit on the third face of the second block;
wherein the first face of each of the first and second fluidic modules is assembled with a face of a block of another fluidic module by contact between the two faces and
wherein the single central conduit or at least one of the plurality of central conduits of the first block is aligned with one of the first and second central conduits of the second block.

2. An assembly according to claim 1, wherein the at least one lateral line of the first block includes at least:
a first lateral conduit of the first block connected to the single central conduit or to one of the plurality of central conduits and having an opening on a third face of the first block; and
a second lateral conduit of the first block having an opening on the said third face of the first block and at least one opening on the second face of the first block forming the fluid access port;
wherein the first closure member is configured so as to close or open the opening of the first lateral conduit of the first block on the third face of the first block and/or the opening of the second lateral conduit of the first block on the third face of the first block.

3. An assembly according to claim 1, wherein the first fluidic module includes at least two lateral lines, each connected to the single central conduit or to one of the plurality of central conduits, and having a fluid access port on a face of the first block not opposite to the first face of the first block, the said first fluidic module comprising a closure member configured so as to close or open each of the at least two lateral lines.

4. An assembly according to claim 1, wherein the first face of the first block and the first face of the second block are planar.

5. An assembly according to claim 1, wherein the face of the first block that is opposite to the first face of the first block is configured so as to be assembled by contact with a face of another fluidic module block.

6. An assembly according to claim 1, wherein the first closure member configured so as to close or open the at least one lateral line of the first fluidic module is an obturator of a valve.

7. An assembly according to claim 6, wherein the one or more valve(s) are selected from the group consisting of pinch valves, needle valves, ball valves, flap gate valves and diaphragm valves.

8. An assembly according to claim 1, wherein the second closure member of the second fluidic module is an obturator of a valve.

9. An assembly according to claim 1, wherein at least one of the first block and the second block is of single-use type.

10. An assembly according to claim 1, wherein the first fluidic module includes at least one sensor and/or one transmitter inserted in the first block of the said first fluidic module.

11. An assembly according to claim 1, including from 2 to 20 fluidic modules.

12. An assembly according to claim 1, wherein a seal is present between faces of blocks assembled by contact.

13. An assembly according to claim 1, wherein the first fluidic module and the second fluidic module are assembled by means of at least one tie rod traversing through the first block and the second block.

14. An assembly according to claim 1, wherein at least one fluidic module is assembled to an end plate by contact between the end plate and a face of the block of the fluidic module.

15. A device comprising at least one assembly according to claim 1 wherein the fluid access port of the at least one lateral line of the first block is connected to a lateral fluid pipe.

16. A separation installation comprising the device according to claim 15 connected to at least one separation device.

17. A fluid conveyance method for conveying fluid in a biomolecule purification installation, including:

providing of an assembly according to claim 1; and circulating of the said fluid within the said assembly.

* * * * *